(12) United States Patent
You et al.

(10) Patent No.: US 11,947,767 B2
(45) Date of Patent: Apr. 2, 2024

(54) TOUCH SENSOR

(71) Applicant: Samsung Display Co., Ltd., Yongin-si (KR)

(72) Inventors: Chun Gi You, Yongin-si (KR); Hyun Sik Park, Yongin-si (KR); Ma Eum Cho, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/727,353

(22) Filed: Dec. 26, 2019

(65) Prior Publication Data

US 2020/0264719 A1   Aug. 20, 2020

(30) Foreign Application Priority Data

Feb. 18, 2019 (KR) .................. 10-2019-0018552

(51) Int. Cl.
  *G06F 3/047* (2006.01)
  *G06F 3/041* (2006.01)
  *G06F 3/044* (2006.01)

(52) U.S. Cl.
  CPC .............. *G06F 3/047* (2013.01); *G06F 3/044* (2013.01); *G06F 3/04146* (2019.05); *G06F 2203/04112* (2013.01)

(58) Field of Classification Search
  CPC .. G06F 3/0446; G06F 3/04146; G06F 3/0443; G06F 3/047; G06F 3/044; G06F 2203/04112; G06F 2203/04111
  USPC .................................................. 345/173, 174
  See application file for complete search history.

(56) References Cited

U.S. PATENT DOCUMENTS

| | | | |
|---|---|---|---|
| 8,717,321 B2 | 5/2014 | Kim | |
| 9,552,120 B2 | 1/2017 | Bae et al. | |
| 10,013,097 B2 | 7/2018 | Choung et al. | |
| 10,109,686 B2 | 10/2018 | Oh et al. | |

(Continued)

FOREIGN PATENT DOCUMENTS

| | | |
|---|---|---|
| CN | 102929576 | 2/2013 |
| CN | 109284027 | 1/2019 |

(Continued)

OTHER PUBLICATIONS

English Translation for KR20100054899A, 2023, pp. 1-7 (Year: 2023).*

*Primary Examiner* — Jimmy H Nguyen
(74) *Attorney, Agent, or Firm* — H.C. Park & Associates, PLC

(57) ABSTRACT

A touch sensor including: a substrate including a sensing area and a non-sensing area; a touch electrode disposed on the sensing area of the substrate; a pad part disposed on the non-sensing area of the substrate; a connection line electrically connecting the touch electrode and the pad part, the connection line including a first connection line and a second connection line surrounding upper and side surfaces of the first connection line; a first insulating layer disposed on the connection line, the first insulating layer exposing at least a portion of the second connection line; and a connection electrode formed on the first insulating layer to protrude to the non-sensing area from one end of the touch electrode, the connection electrode being physically connected to the exposed second connection line through the first insulating layer.

9 Claims, 16 Drawing Sheets

(56) References Cited

U.S. PATENT DOCUMENTS

| | | |
|---|---|---|
| 10,592,056 B2 | 3/2020 | Lee et al. |
| 2011/0316803 A1 | 12/2011 | Kim |
| 2012/0127094 A1 | 5/2012 | Jeong |
| 2013/0136949 A1 | 5/2013 | Okuno et al. |
| 2014/0320761 A1 | 10/2014 | Misaki |
| 2016/0306473 A1* | 10/2016 | Lee ................ G06F 3/0412 |
| 2016/0320876 A1* | 11/2016 | Son ................ G06F 3/04164 |
| 2018/0033829 A1* | 2/2018 | Oh ................ G06F 3/03547 |
| 2018/0061897 A1* | 3/2018 | Oh ................ H01L 27/3279 |
| 2021/0200405 A1* | 7/2021 | Chen ................ G06F 3/0443 |

FOREIGN PATENT DOCUMENTS

| | | | |
|---|---|---|---|
| KR | 20100054899 A * | 5/2010 | ......... G06F 3/0448 |
| KR | 10-1347375 | 1/2014 | |
| KR | 10-1437034 | 11/2014 | |
| KR | 10-2015-0092813 | 8/2015 | |
| KR | 10-2016-0017830 | 2/2016 | |
| KR | 10-2017-0051789 | 5/2017 | |
| KR | 10-1908982 | 10/2018 | |

* cited by examiner

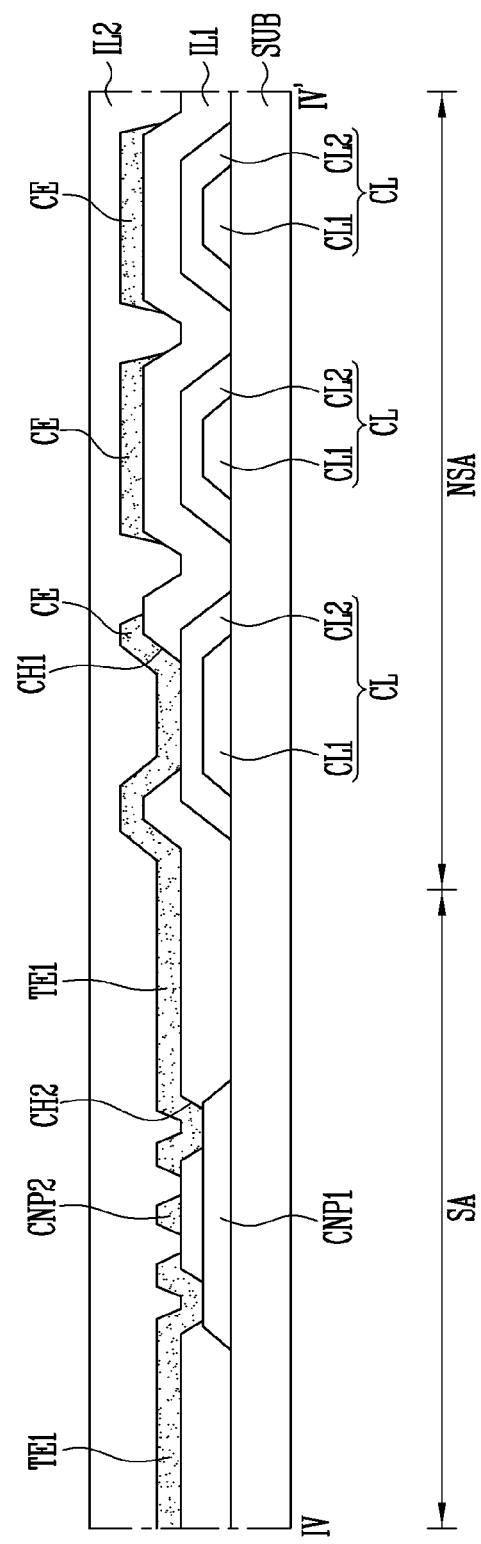

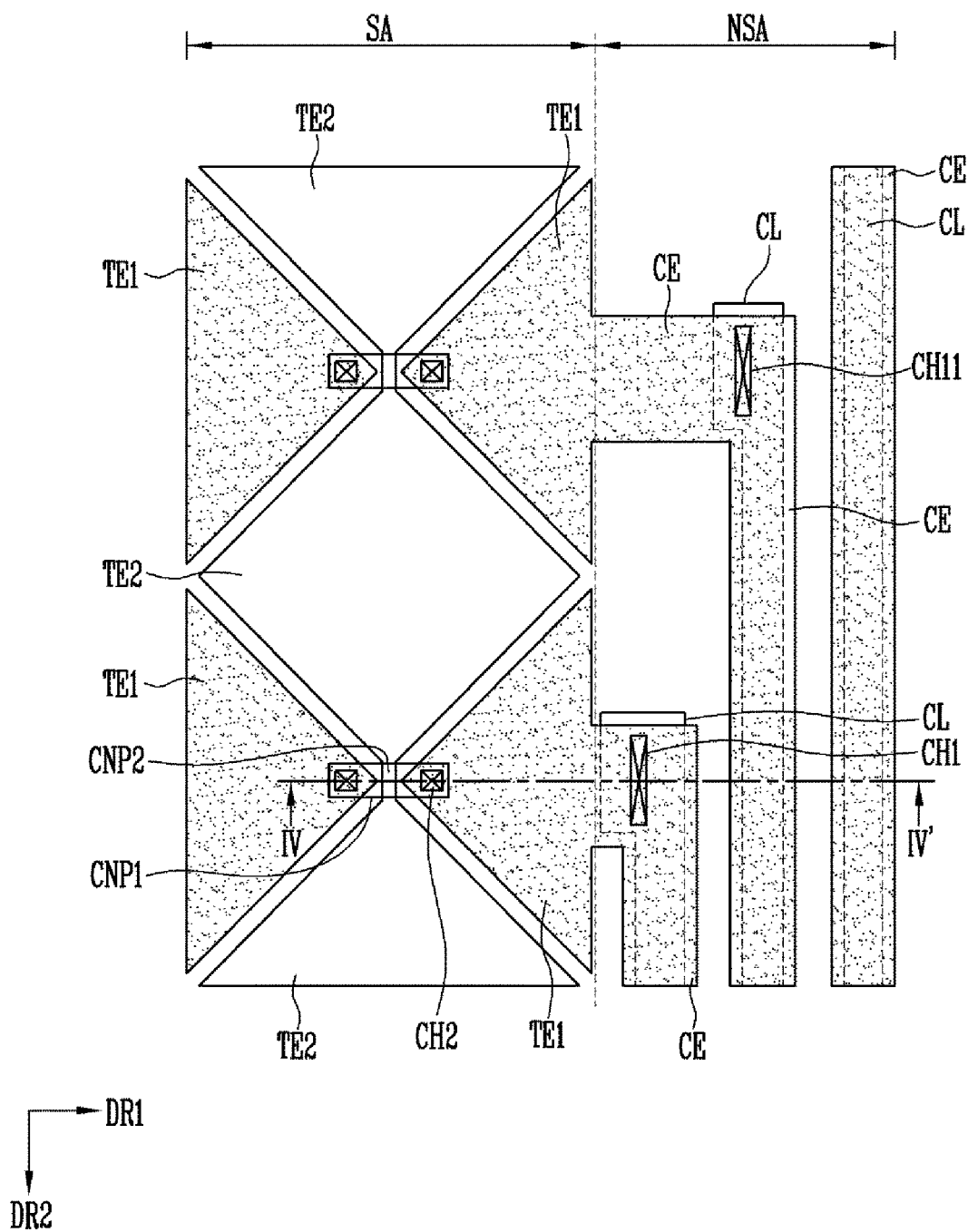

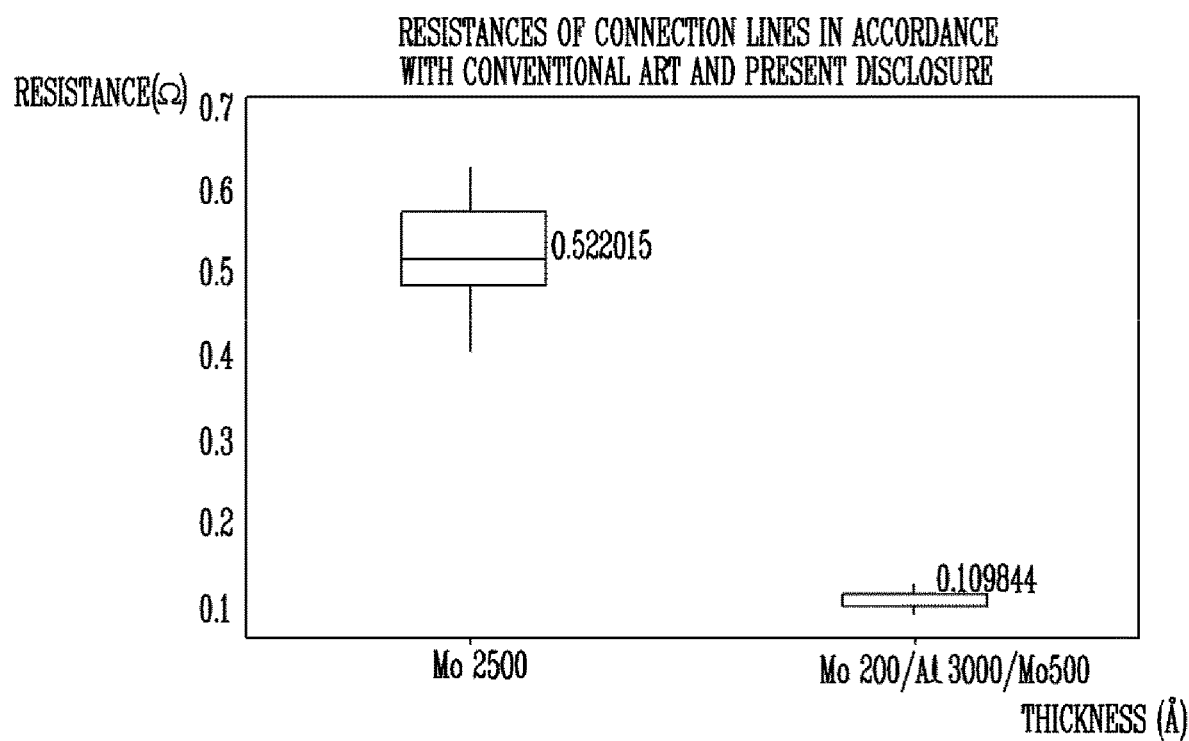

TOUCH SENSOR

CROSS-REFERENCE TO RELATED APPLICATION

This application claims priority from and the benefit of Korean Patent Application No. 10-2019-0018552, filed on Feb. 18, 2019, which is hereby incorporated by reference for all purposes as if fully set forth herein.

BACKGROUND

Field

Exemplary embodiments of the invention relate generally to a low-resistance touch sensor.

Discussion of the Background

A touch sensor is an input device that enables a user's command to be input by selecting an instruction content displayed on a screen such as a display device with a user's hand or other object. The touch sensor converts a contact position at which a user's hand or other object is in contact with the touch sensor into an electrical signal, so that an instruction content selected at the contact position can become an input signal of a display device. Thus, the display device provided with the touch sensor can be operated without any separate input device such as a keyboard or mouse.

The above information disclosed in this Background section is only for understanding of the background of the inventive concepts, and, therefore, it may contain information that does not constitute prior art.

SUMMARY

Devices constructed according to exemplary implementations/embodiments of the invention are capable of providing a low-resistance touch sensor that is suitable for a large-area display device by decreasing resistance of a connection line for electrically connecting a pad part and a touch electrode of the touch sensor.

Additional features of the inventive concepts will be set forth in the description which follows, and in part will be apparent from the description, or may be learned by practice of the inventive concepts.

In accordance with an exemplary embodiment of the inventive concepts, there is provided a touch sensor including: a substrate including a sensing area and a non-sensing area; a touch electrode disposed on the sensing area of the substrate; a pad part disposed on the non-sensing area of the substrate; a connection line electrically connecting the touch electrode and the pad part, the connection line including a first connection line and a second connection line surrounding upper and side surfaces of the first connection line; a first insulating layer disposed on the connection line, the first insulating layer exposing at least a portion of the second connection line; and a connection electrode formed on the first insulating layer to protrude to the non-sensing area from one end of the touch electrode, the connection electrode being physically connected to the exposed second connection line through the first insulating layer.

The connection line and the connection electrode may be electrically connected through a first contact hole exposing the second connection line, the first contact hole being formed by removing a portion of the first insulating layer.

The connection electrode may overlap with the connection line with the first insulating layer interposed therebetween in at least a partial area except the first contact hole.

The connection electrode may extend along a direction in which the connection line extends toward the pad part, and overlap with at least a portion of the connection line.

The first connection line may have a single- or multi-layered structure including aluminum.

The first connection line may have a triple structure of molybdenum (Mo)/aluminum (Al)/molybdenum (Mo).

The second connection line may include an opaque conductive material or a transparent conductive material.

The connection electrode may include a transparent conductive material.

At least one of the first connection line and the second connection line may include the same material provided on the same layer as at least a portion of the touch electrode.

The touch electrode may include: a touch electrode row having a plurality of first touch electrodes arranged along a first direction; a touch electrode column having a plurality of second touch electrodes arranged along a second direction intersecting the first direction; a first connection pattern electrically connecting a first touch electrode to an adjacent first touch electrode; and a second connection pattern electrically connecting a second touch electrode to an adjacent second touch electrode.

At least one of the first touch electrode, the second touch electrode, the first connection pattern, and the second connection pattern of the touch electrode may include the same material provided on the same layer as at least one of the first connection line and the second connection line, and the others of the first touch electrode, the second touch electrode, the first connection pattern, and the second connection pattern of the touch electrode may include the same material provided on the same layer as the connection electrode.

In accordance with another exemplary embodiment of the inventive concepts, there is provided a touch sensor including: a substrate including a sensing area and a non-sensing area; a touch electrode disposed on the sensing area of the substrate; a pad part disposed on the non-sensing area of the substrate; a connection electrode extending to the non-sensing area from one end of the touch electrode; a first insulating layer disposed on the connection electrode, the first insulating layer exposing at least a portion of the connection electrode; and a connection line disposed on the first insulating layer, the connection line electrically connecting the touch electrode and the pad part by being physically connected a portion of the exposed connection electrode through the first insulating layer, the connection line including a first connection line and a second connection line surrounding upper and side surfaces of the first connection line.

The connection line may extend along a direction in which the connection line extends toward the pad part, and overlap with at least a portion of the connection line.

The first connection line may have a single- or multi-layered structure including aluminum.

The first connection line may have a triple structure of molybdenum (Mo)/aluminum (Al)/molybdenum (Mo).

The second connection line may include an opaque conductive material or a transparent conductive material.

The connection electrode may include a transparent conductive material.

At least one of the first connection line and the second connection line may include the same material provided on the same layer as at least a portion of the touch electrode.

The touch electrode may include: a touch electrode row having a plurality of first touch electrodes arranged along a first direction; a touch electrode column having a plurality of second touch electrodes arranged along a second direction intersecting the first direction; a first connection pattern electrically connecting a first touch electrode to an adjacent first touch electrode; and a second connection pattern electrically connecting a second touch electrode to an adjacent second touch electrode.

At least one of the first touch electrode, the second touch electrode, the first connection pattern, and the second connection pattern of the touch electrode may include the same material provided on the same layer as at least one of the first connection line and the second connection line, and the others of the first touch electrode, the second touch electrode, the first connection pattern, and the second connection pattern of the touch electrode may include the same material provided on the same layer as the connection electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIG. 6B is a sectional view taken along line IV-IV' shown in FIG. 6A.

FIG. 7 is an enlarged plan view illustrating another example of the portion AA shown in FIG. 1.

FIG. 13 is a graph comparing resistances of connection lines in accordance with a conventional art connection line and an exemplary embodiment of the inventive concepts.

DETAILED DESCRIPTION

Figure 1:
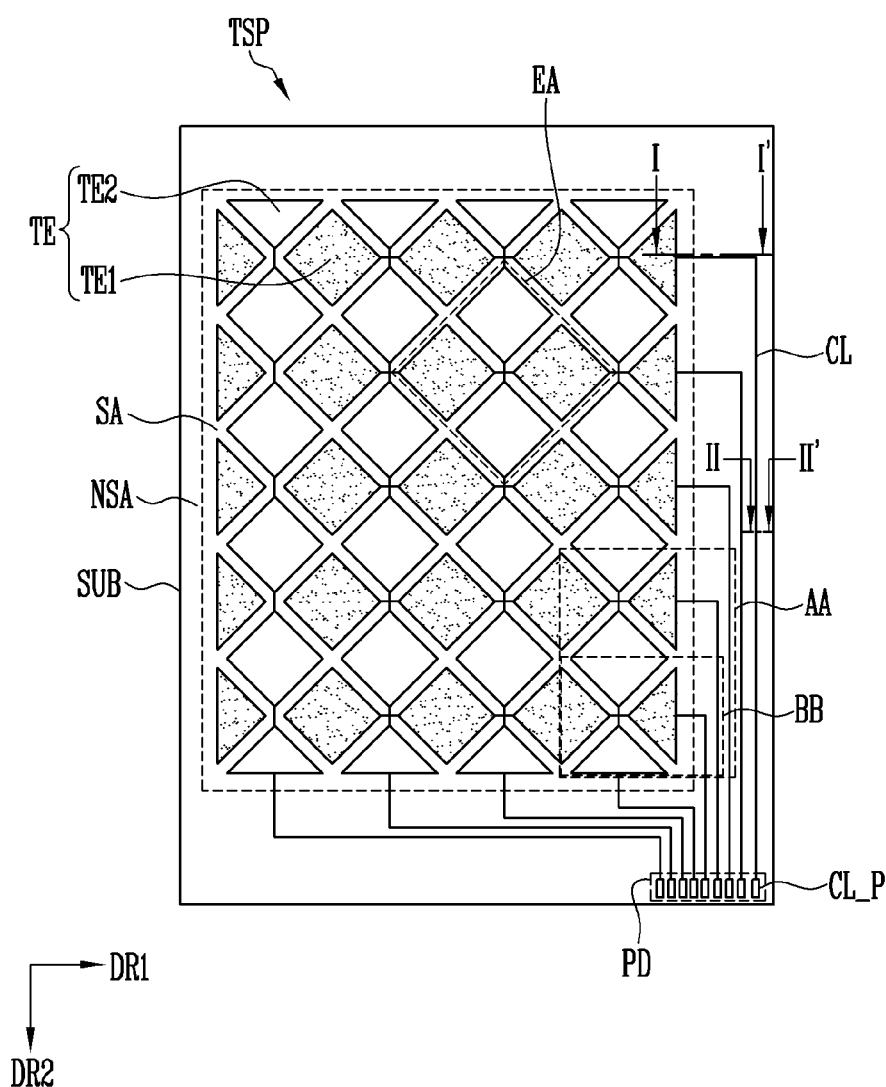
FIG. 1 is a plan view illustrating a touch sensor in accordance with an exemplary embodiment of the inventive concepts.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2A:
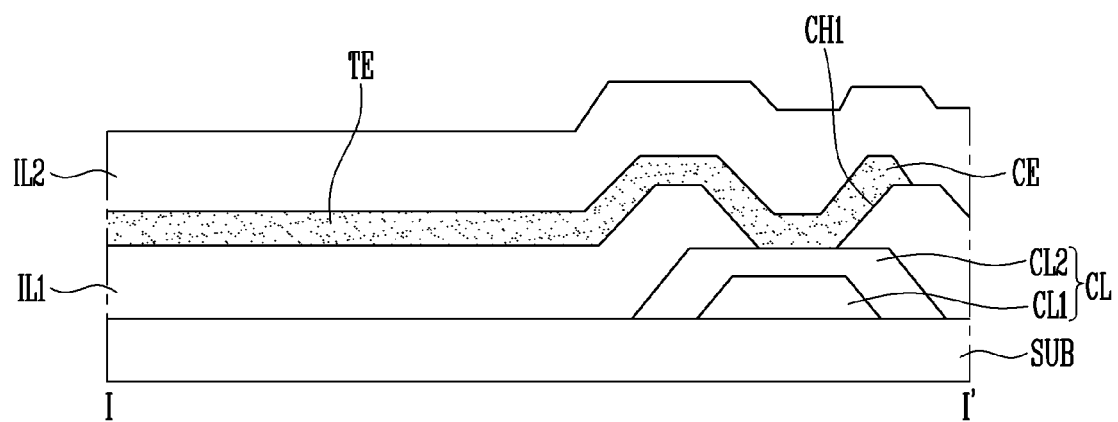
FIG. 2A is a sectional view taken along line I-I' shown in FIG. 1 in accordance with an exemplary embodiment.
Figure 2B:
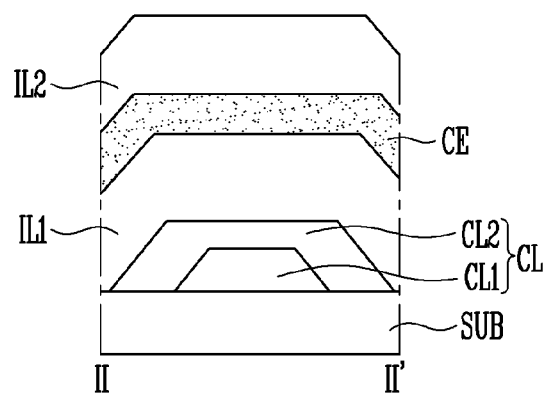
FIG. 2B is a sectional view taken along line II-II' shown in FIG. 1 in accordance with an exemplary embodiment.

FIG. 1 is a plan view illustrating a touch sensor in accordance with an exemplary embodiment of the inventive concepts. FIG. 2A is a sectional view taken along line I-I' shown in FIG. 1 in accordance with an exemplary embodiment. FIG. 2B is a sectional view taken along line II-II' shown in FIG. 1 in accordance with an exemplary embodiment.

As shown in FIGS. 1, 2A, and 2B, the touch sensor TSP in accordance with the exemplary embodiment includes a base substrate SUB, a touch electrode TE and a pad part PD, which are disposed on the base substrate SUB, and a connection line CL connecting the touch electrodes TE and the pad part PD. The connection line CL includes a first connection line CL1 provided in a single layer or multi-layer and a second connection line CL2 completely surrounding the top of the first connection line CL1.

The base substrate SUB may be formed of a transparent insulative material including glass, quartz, ceramic, plastic or the like. When the base substrate SUB is made of the plastic, the base substrate SUB may be formed as a flexible substrate. For example, the base substrate SUB may be made of an organic material selected from the group consisting of polyethersulfone (PES), polyacrylate (PAR), polyetherimide (PEI), polyethylene naphthalate (PEN), polyethylene terephthalate (PET), polyphenylene sulfide (PPS), polyarylate, polyimide, polycarbonate (PC), triacetate cellulose (TAC), and cellulose acetate propionate (CAP).

The base substrate SUB may include a sensing area SA in which a touch of a user is recognized and a non-sensing area NSA in which the touch of the user is not recognized. Although a case where the sensing area SA and the non-sensing area NSA are provided in a quadrangular shape is illustrated in FIG. 1, the inventive concepts are not limited thereto.

The sensing area SA may overlap with a display area of a display panel (not shown) that may be disposed on one surface of the base substrate SUB. For example, the sensing area SA may have a shape corresponding to that of the display area. In addition, the non-sensing area NSA may overlap with a non-display area of the display panel.

A plurality of touch electrodes TE may be provided in the sensing area SA, and the pad part PD, connection lines CL connecting the touch electrodes TE to the pad part PD, and the like may be provided in the non-sensing area NSA. The pad part PD may include a plurality of pads CL_P. The pads CL_P may be electrically connected to the touch electrodes TE through the connection lines CL, respectively.

Some of the touch electrodes TE are arranged in a first direction DR1, and touch electrodes TE arranged side by side along the first direction DR1 for each row are electrically connected to each other, to constitute a plurality of touch electrode rows formed in the shape of lines parallel to each other. The touch electrode TE included in the touch electrode row may be a first touch electrode TE1. In addition, the others except the first touch electrodes TE1 among the touch electrodes TE are arranged in a second direction DR2 intersecting the first direction DR1, and touch electrodes TE arranged side by side along the second direction DR2 for each column are electrically connected to each other, to constitute a plurality of touch electrode columns formed in the shape of lines parallel to each other. The touch electrode TE included in the touch electrode column may be a second touch electrode TE2.

On each touch electrode row, a plurality of first touch electrodes TE1 may be integrally formed to be connected to each other without any separate connection pattern, or adjacent first touch electrodes TE1 may be electrically connected to each other through a connection pattern. On each touch electrode column, a plurality of second touch electrodes TE2 may be integrally formed to be connected to each other without any separate connection pattern, or adjacent second touch electrodes TE2 may be electrically connected to each other through a connection pattern.

Meanwhile, although a case where the first and second touch electrodes TE1 and TE2 have a rhombus shape is illustrated in FIG. 1, the shape of the first and second touch electrodes TE1 and TE2 is not limited thereto. Also, at least a portion of each of the first and second touch electrodes TE1 and TE2 may have a mesh shape having a structure in which fine patterns intersect each other. Thus, a decrease in aperture ratio and transmissivity of a display device can be prevented or reduced by the touch electrode TE.

The first and second touch electrodes TE1 and TE2 may be formed of a transparent conductive material such as Indium Tin Oxide (ITO) or Indium Zinc Oxide (IZO). In particular, as described above, when each of the first and second touch electrodes TE1 and TE2 are connected to each other through a separate connection pattern, the connection pattern may be formed of the above-described transparent conductive material like the first and second touch electrodes TE1 and TE2, or be formed of an opaque conductive material selected from molybdenum (Mo), silver (Ag), titanium (Ti), copper (Cu), aluminum (Al), and the like.

Each touch electrode row and each touch electrode column may be connected to pads CL_P through connection lines CL, respectively. One of the touch electrode row and the touch electrode column may be applied with a driving signal for touch sensing through the connection line CL, and the other of the touch electrode row and the touch electrode column may transfer a touch sensing signal through the connection line CL. For example, the touch electrode row may transfer a touch sensing signal, and the touch electrode column may be applied with a touch driving signal. In addition, the pad part PD is connected to an external driving circuit (not shown) such as a position detecting circuit, so that the touch electrode TE and the external driving circuit can be electrically connected to each other.

At least a portion of the touch electrode TE protrudes to the non-sensing area NSA to extend up to an upper surface of the connection line CL, so that a connection electrode CE having a shape protruding from the touch electrode TE can be directly connected to the connection line CL. Although a connection electrode CE formed when the first touch electrode TE1 extends up to the upper surface of the connection line CL such that a portion of the first touch electrode TE1 is connected to the connection line CL is illustrated in FIG. 2A, the connection line CL connected to the second touch electrode TE2 protrudes to the non-sensing area NSA to extend up to the upper surface of the connection line CL, so that a connection electrode CE having a shape protruding from the second touch electrode TE2 can be directly connected to the connection line CL.

To this end, in the non-sensing area NSA, the connection line CL is exposed by partially removing a first insulating layer IL1 disposed on the upper surface of the connection line CL, and the second connection line CL2 that is the exposed upper surface of the connection line CL and the connection electrode CE may be electrically connected to each other.

The connection electrode CE protruding to the non-sensing area NSA from each of the first and second touch electrodes TE1 and TE2 to be connected to each connection line CL may extend long along the length direction of the connection line CL (e.g., the second direction DR2 shown in FIG. 1). As shown in FIG. 2B, the connection electrode CE overlaps with the connection line CL with the first insulating layer IL1 interposed therebetween in an area around a first contact hole CH1 connected to the connection line CL. The connection electrode CE may extend up to the pad part PD along the length direction of the connection line CL to entirely or partially overlap with the upper surface of the connection line CL except the first contact hole CH1 with the first insulating layer IL1 interposed therebetween.

The connection electrode CE overlaps with the upper surface of the connection line CL, so that a defect such as a pin hole generated in the first insulating layer IL1 on the connection line in patterning of the connection electrode CE can be prevented or reduced. In an embodiment, the first touch electrode TE1, the second touch electrode TE2, and the connection electrode CE may be formed by integrally applying a transparent conductive material such as Indium Tin Oxide (ITO) or Indium Zinc Oxide (IZO) onto an upper surface of the first insulating layer IL1 and then patterning the transparent conductive material, using a technique such as etching. In the patterning of the connection electrode CE, a portion of the first insulating layer IL1 is etched together with the connection electrode CE, and therefore, a pin hole or the like may be generated. Due to the pin hole, a defect may occur in the connection line CL, or touch sensitivity may be degraded.

Thus, the connection electrode CE overlaps with the upper surface of the connection line CL, so that etching of the first insulating layer IL1 over the connection line CL can be prevented or reduced, and the occurrence of a defect in the connection line CL can be prevented or reduced.

In an exemplary embodiment, a width of the connection electrode CE overlapping with the connection line CL in the first direction DR1 may be wider than that of the connection line CL in the first direction DR1. Thus, the occurrence of a defect in the connection line CL can be prevented or reduced.

Hereinafter, a structure of the connection line CL will be described in detail as follows.

The connection line CL may include a first connection line CL1 provided in a single layer or multi-layer and a second connection line CL2 surrounding upper and side surfaces of the first connection line CL1.

The first connection line CL1 may be provided in a single- or multi-layered structure formed of an opaque conductive material such as molybdenum (Mo), silver (Ag), titanium (Ti), copper (Cu) or aluminum (Al). The first connection line CL1 may include aluminum (Al) having low resistance so as to achieve low resistance of the first connection line CL1.

The second connection line CL2 may be disposed on the first connection line CL1. The second connection line CL2 may have a structure surrounding the upper and side surfaces of the first connection line CL1. The second connection line CL2 caps the first connection line CL1, so that generation of a hillock of aluminum (Al) included in the first connection line CL1 can be prevented or reduced, and disconnection of the first connection line can be minimized.

The second connection line CL2 may be selected from an opaque conductive material such as molybdenum (Mo), silver (Ag), titanium (Ti) or copper (Cu), and a transparent conductive material such as Indium Tin Oxide (ITO) or Indium Zinc Oxide (IZO). In particular, destruction of the low-resistance first connection line CL1 due to thermal expansion, which is caused by the second connection line CL2, can be prevented or reduced.

Figure 3A:
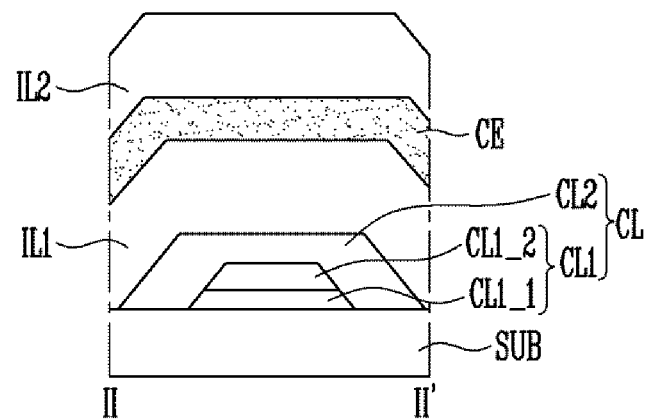
FIGS. 3A and 3B are sectional views taken along the line II-II' shown in FIG. 1 in accordance with other exemplary embodiments.
Figure 3B:
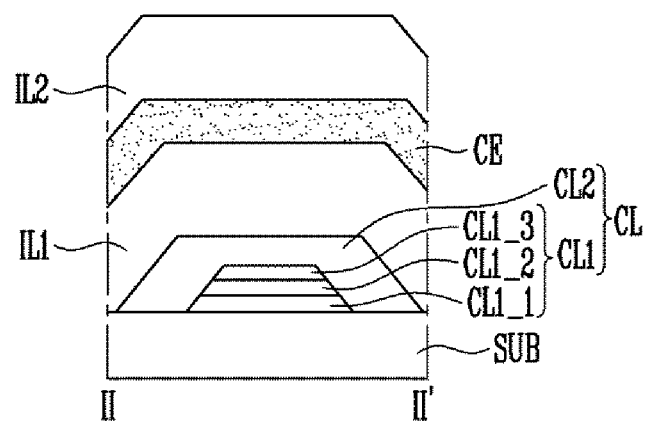

FIGS. 3A and 3B are sectional views taken along the line II-II' shown in FIG. 1 in accordance with other exemplary embodiments.

As shown in FIG. 3A, the first connection line CL1 of the connection line CL may have a structure in which a first sub-line CL1_1 and a second sub-line CL1_2 are stacked. At least one of the first sub-line CL1_1 and the second sub-line CL1_2 may be a metal layer including aluminum (Al).

In addition, the second connection line CL2 may have a structure surrounding the upper and side surfaces of the first connection line CL1. As shown in FIG. 3B, the first connection line CL1 of the connection line CL may have a structure in which a first sub-line CL1_1, a second sub-line CL1_2, and a third sub-line CL1_3 are stacked. At least one of the first sub-line CL1_1, the second sub-line CL1_2, and the third sub-line CL1_3 may be a metal layer including aluminum (Al).

For example, the first connection line CL1 in which the first sub-line CL1_1, the second sub-line CL1_2, and the third sub-line CL1_3 are sequentially stacked may have a structure of molybdenum (Mo)/aluminum (Al)/molybdenum (Mo). The thicknesses of molybdenum (Mo)/aluminum (Al)/molybdenum (Mo) may be 200 Å/3000 Å/500 Å, respectively. For example, when the second connection line CL2 is provided in a single layer including molybdenum (Mo), the thickness of the second connection line CL2 may be 2600 Å. For example, when the second connection line CL2 includes Indium Tin Oxide (ITO), the thickness of the second connection line CL2 may be 1350 Å.

As described above, the first connection line CL1 of the connection line CL is to include at least one layer made of aluminum so as to achieve low resistance of the connection line CL. For example, when the first connection line CL1 has a single-layered structure as shown in FIG. 2A, the first connection line CL1 may be provided in a single layer including only aluminum or a single layer including aluminum and another metal. Also, when the first connection line CL has a multi-layered structure as shown in FIGS. 3A and 3B, the first connection line CL1 is to include at least one layer including only aluminum or including aluminum and another metal.

Since the first connection line CL1 is formed using one mask, each metal layer may be exposed at the side surface of the first connection line CL1. For example, when the first connection line CL1 has a structure in which an aluminum layer and a molybdenum layer are sequentially stacked, both aluminum and molybdenum are exposed at the side surface of the first connection line CL1. Thus, the second connection line CL2 is disposed to surround not only the upper surface of the first connection line CL1 but also the side surface of the first connection line CL1, so that generation of a hillock of aluminum can be prevented or reduced, and disconnection of the first connection line CL1 can be minimized.

In addition, a second insulating layer IL2 may be disposed on the base substrate SUB to cover the connection electrode CE and the touch electrode TE. The second insulating layer IL2 may include at least one of an organic insulating layer including an organic material and an inorganic insulating layer including an inorganic material. For example, the second insulating layer IL2 may include at least one of silicon oxide, silicon nitride, and silicon oxynitride.

Hereinafter, a structure of the touch electrode will be described in detail as follows.

Figure 4A:
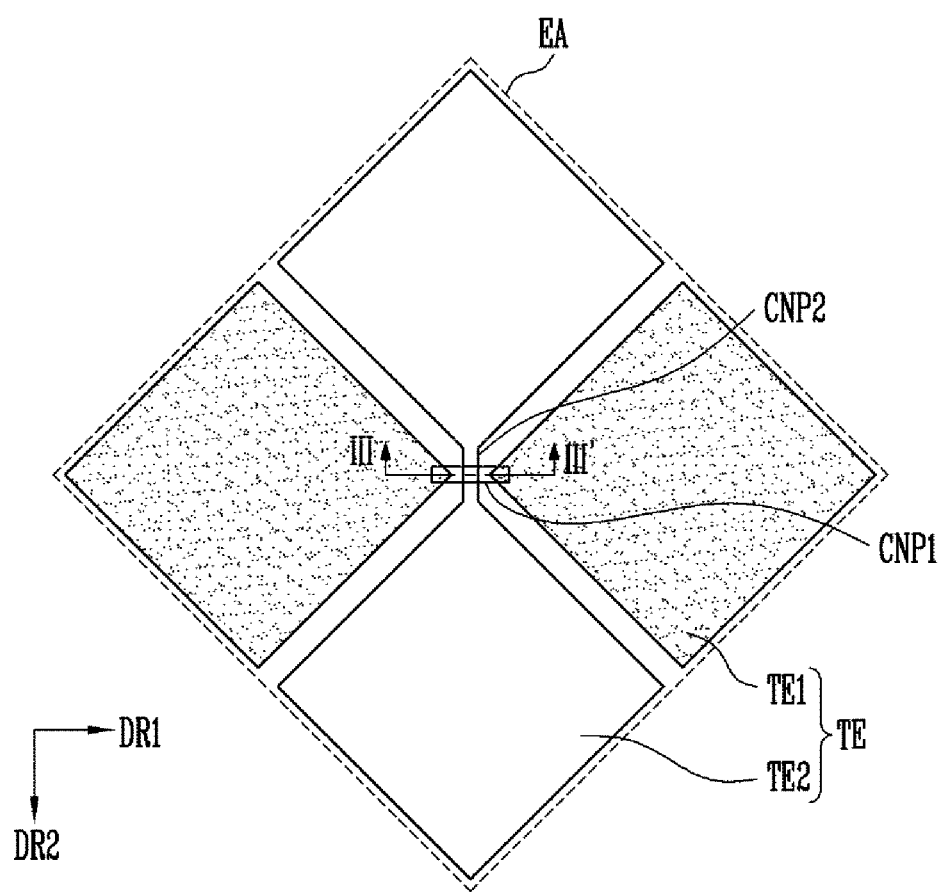
FIG. 4A is a plan view illustrating a structure of area EA shown in FIG. 1.
Figure 4B:
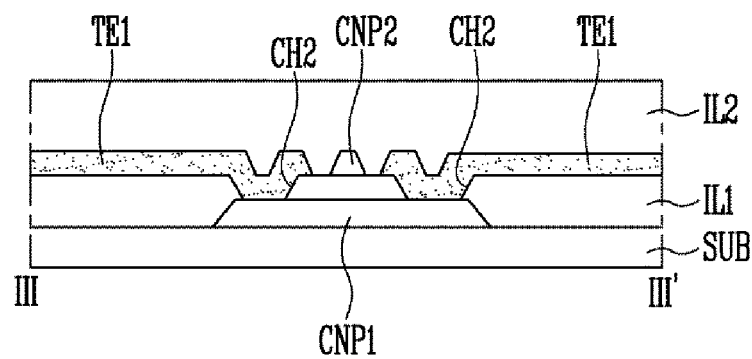
FIG. 4B is a sectional view taken along line III-III' shown in FIG. 4A.
Figure 5A:
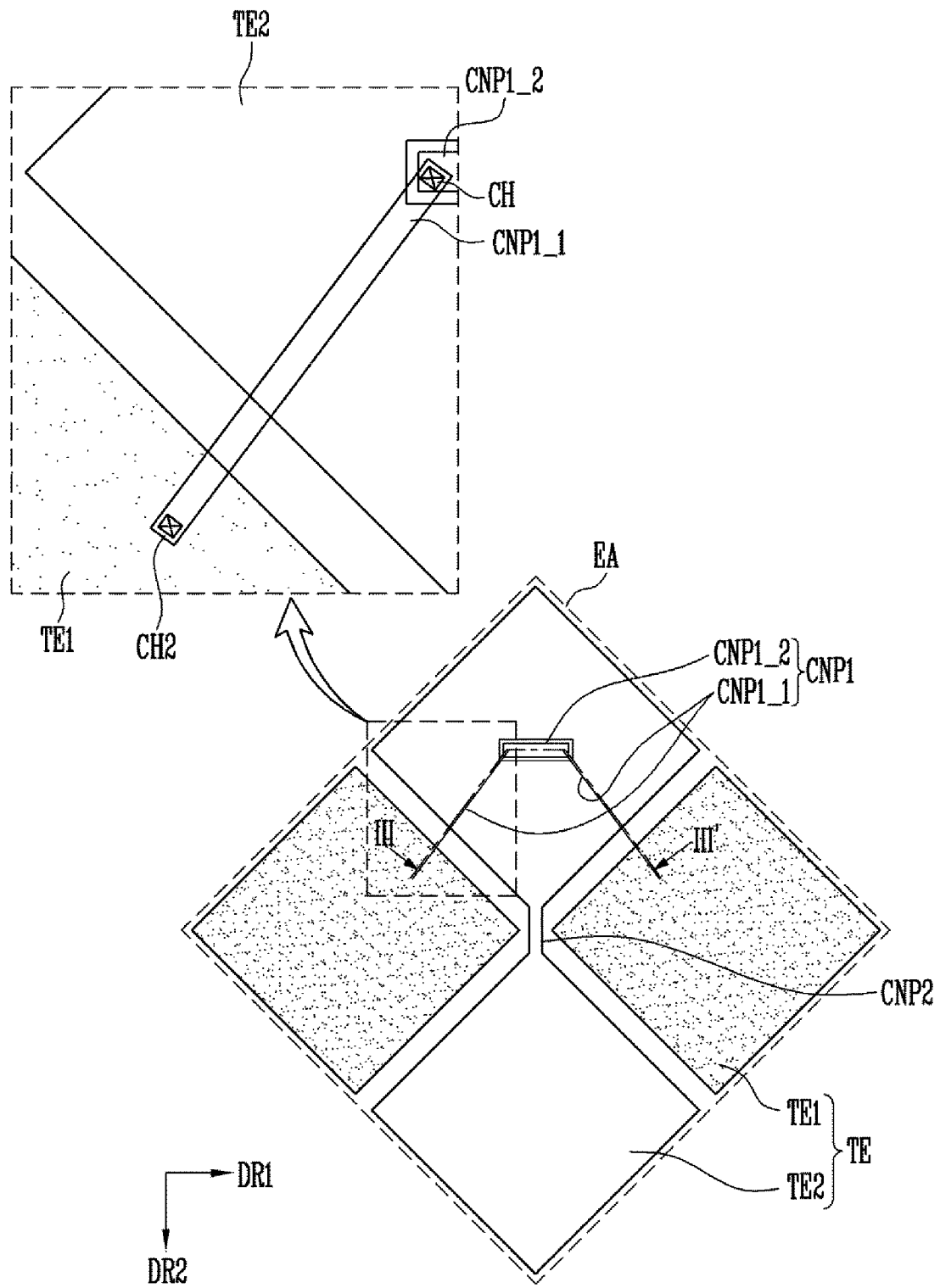
FIG. 5A is a plan view illustrating another structure of the area EA shown in FIG. 1.
Figure 5B:
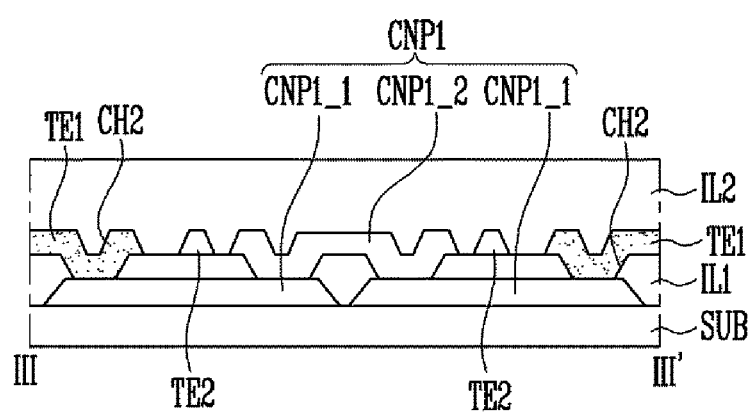
FIG. 5B is a sectional view taken along the line III-III' shown in FIG. 5A.

FIG. 4A is a plan view illustrating a structure of area EA shown in FIG. 1. FIG. 4B is a sectional view taken along line III-III' shown in FIG. 4A. FIG. 5A is a plan view illustrating another structure of the area EA shown in FIG. 1. FIG. 5B is a sectional view taken along the line III-III' shown in FIG. 5A.

First, as shown in FIGS. 4A and 4B, the touch electrode TE may include first and second touch electrodes TE1 and TE2 on the base substrate SUB. First touch electrodes TE1 disposed adjacent to each other along the first direction DR1 may be connected to each other through a first connection pattern CNP1, and second touch electrodes TE2 disposed adjacent to each other along the second direction DR2 may be connected to each other through a second connection pattern CNP2.

Specifically, the first connection pattern CNP1 formed by patterning a first conductive layer may be disposed on the base substrate SUB. The first conductive layer may be at least one conductive layer including a conductive material. The conductive material may be selected from an opaque conductive material such as molybdenum (Mo), silver (Ag), titanium (Ti) or copper (Cu), and a transparent conductive material such as Indium Tin Oxide (ITO) or Indium Zinc Oxide (IZO). However, the inventive concepts are not limited thereto.

The first connection pattern CNP1 is used to electrically connect first touch electrodes TE1 arranged side by side along the first direction DR1. The first connection pattern CNP1 may also have a shape extending along the first direction DR1.

In addition, a first insulating layer IL1 may be disposed on the base substrate SUB to cover the first connection pattern CNP1. The first insulating layer IL1 may include at least one of an organic insulating layer including an organic material and an inorganic insulating layer including an inorganic material. For example, the first insulating layer IL1 may include at least one of silicon oxide, silicon nitride, and silicon oxynitride.

In addition, the first touch electrode TE1, the second touch electrode, and the second connection pattern CNP2 may be formed by allowing the first insulating layer IL1 to expose a portion of the first touch electrode TE1, forming a second conductive layer on the first insulating layer IL1 to cover the exposed first touch electrode TE1, and then patterning the second conductive layer.

Like the first conductive layer, the second conductive layer may be formed in at least one layer including a conductive material. By patterning the second conductive layer as described above, the first touch electrodes TE1 arranged along the first direction DR1 to be connected through the first connection pattern CNP and the second touch electrodes arranged along the second direction DR2 may be formed, and the second connection pattern CNP2 connecting adjacent second touch electrode TE2 to each other may be formed.

In addition, the second insulating layer IL2 may be provided on the first insulating layer IL1 on which the first touch electrode TE1, the second touch electrode TE2, and the second connection pattern CNP2 are provided. The second insulating layer IL2 prevents the first touch electrode TE1, the second touch electrode TE2, and the second connection pattern CNP2 from being exposed to the outside, so that corrosion of the first touch electrode TE1, the second touch electrode TE2, and the second connection pattern CNP2 can be prevented or reduced. The second insulating layer IL2 may include at least one of an organic insulating layer including an organic material and an inorganic insulating layer including an inorganic material.

The first touch electrode TE1, the second touch electrode TE2, and the second connection pattern CNP2 may be formed by patterning the first conductive layer, and the first connection pattern CNP1 may be formed by patterning the second conductive layer. The arrangement of the first touch electrode TE1, the second touch electrode TE2, the first connection pattern CNP1, and the second connection pattern CNP2 is not limited thereto, and may be easily modified.

In addition, as shown in FIGS. 5A and 5B, the first connection pattern CNP1 extends in an oblique direction intersecting the first direction DR1 and the second direction DR2, to connect first touch electrodes TE1 arranged side by side along the first direction DR1. This is provided by considering visual characteristics of human beings, in which awareness with respect to the oblique direction is degraded as compared with the first direction DR1 and the second direction DR2.

When the first connection pattern CNP1 extends in the oblique direction intersecting the first direction DR1 and the second direction DR2, the first connection pattern CNP1 may include a first sub-connection pattern CNP1_1 and a second sub-connection pattern CNP1_2.

At least two first sub-connection patterns CNP1_1 may be disposed on the base substrate SUB to be separated from each other, to be respectively connected to the first touch electrodes TE1 disposed on the first insulating layer IL1 through second contact holes CH2. Also, the first sub-connection patterns CNP1_1 separated from each other may be connected to each other through the second sub-connection pattern CNP1_2 disposed in the same layer as the first touch electrode TE1, the second touch electrode TE2, and the second connection pattern CNP2, which are formed by patterning the second conductive layer.

As described above, a portion of the touch electrode TE is formed to protrude up to the non-sensing area NSA, to be electrically connected to the connection line CL.

Hereinafter, a structure between the sensing area SA and the non-sensing area NSA of the touch sensor in which the connection line and the touch electrode TE are connected to each other in accordance with an exemplary embodiment will be described in detail as follows with reference to the accompanying drawings.

Figure 6A:
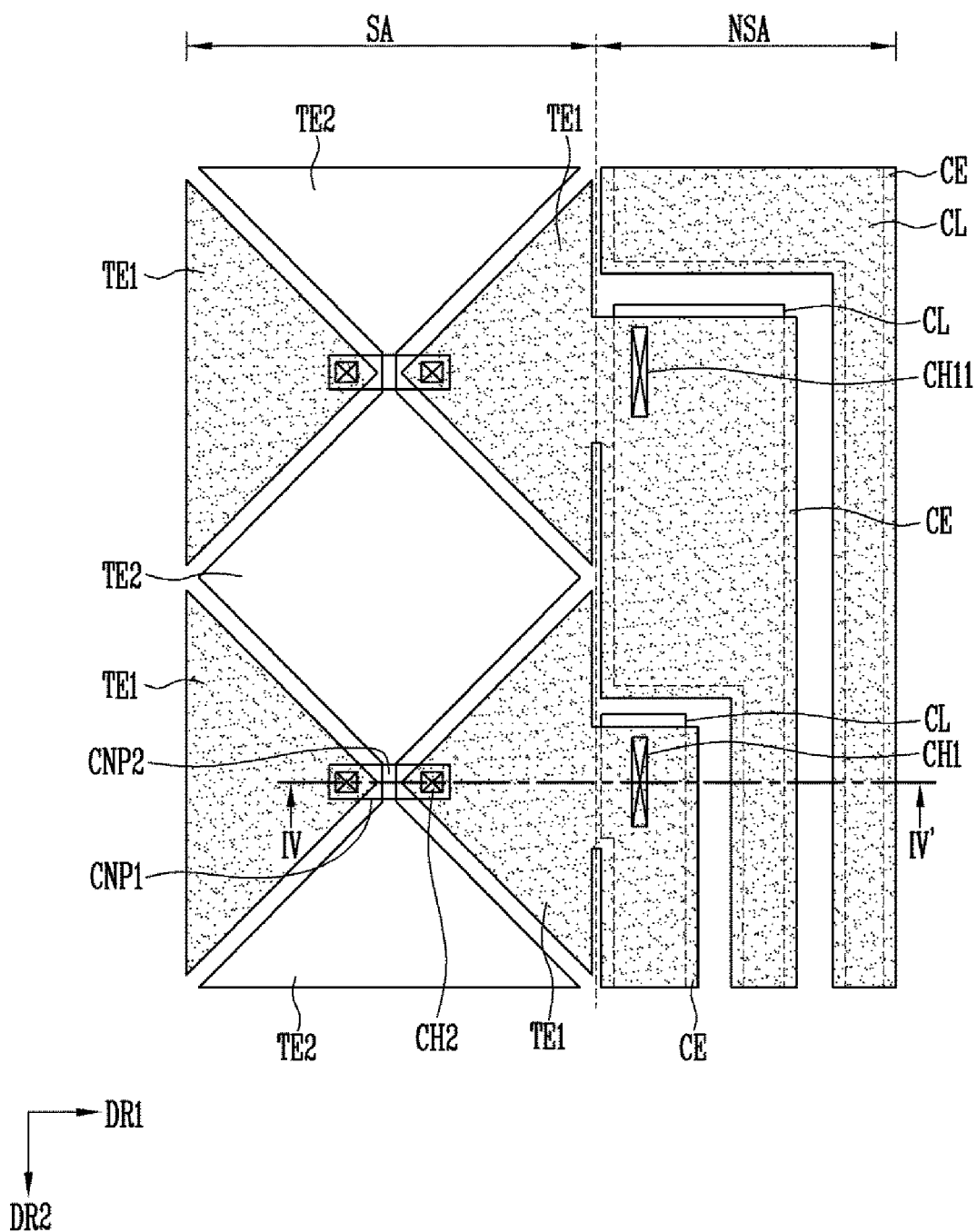
FIG. 6A is an enlarged plan view illustrating an example of portion AA shown in FIG. 1.

FIG. 6A is an enlarged plan view illustrating an example of portion AA shown in FIG. 1. FIG. 6B is a sectional view taken along line IV-IV' shown in FIG. 6A.

As shown in FIGS. 6A and 6B, the touch electrode TE protrudes to the non-sensing area NSA, to be electrically connected to the connection line CL. At least one of the first connection line CL1 and the second connection line CL2 of the connection line CL may include the same material provided on the same layer as at least one of the first and second touch electrodes TE1 and TE2 and the first and second connection patterns CNP1 and CNP2 of the sensing area SA. A case where the second connection line CL2 is formed of the same material on the same layer as the first connection pattern CNP1 of the sensing area SA is illustrated in the drawings. However, the inventive concepts are not limited thereto, and the first connection pattern CNP1 may be formed of the same material in the same layer as at least one of the first connection line CL1 and the second connection line CL2.

In addition, the first and second contact holes CH1 and CH2 respectively exposing the connection line CL and the first connection pattern CNP1 may be formed by disposing the first insulating layer IL1 on the base substrate SUB to cover the connection line CL and the first connection pattern CNP1 and selectively removing the first insulating layer IL1. In addition, the first and second touch electrodes TE1 and TE2 and the second connection pattern CNP2 may be disposed on the first insulating layer IL1. The first touch electrode TE1 may be electrically connected to the first connection pattern CNP1 exposed by the first insulating layer IL1.

At the same time, the connection electrode CE formed when the first touch electrode TE1 extends may be disposed even in the non-sensing area NSA to be connected to the connection line CL through the first contact hole CH1. That is, the connection electrode CE extends onto the first insulating layer IL1 along the length direction of the connection line CL (e.g., the second direction DR2), so that at least a portion of the connection electrode CE can overlap with the connection line CL with the first insulating layer IL1 interposed therebetween in an area except the first contact hole CH1.

In some exemplary embodiments, as shown in FIG. 6A, some of the connection electrodes CE extending from the respective first touch electrodes TE1 may have different widths on touch electrode rows. For example, a connection electrode CE may be formed to have an area as wide as possible within a range where it is not in contact with a connection electrode CE or a connection line CL on an adjacent touch electrode row. In an example, distances between adjacent connection electrodes CE may be substantially uniform. Accordingly, first and eleventh contact holes CH1 and CH11 formed on different touch electrode rows may be located on the same line with respect to the second direction DR2. The eleventh contact hole CH11 may correspond to a touch electrode row different from that of the first contact hole CH1, and be a portion at which a predetermined connection electrode CE and a predetermined connection line CL are physically, electrically connected to each other.

The connection lines CL may have different shapes and areas depending on connection electrodes overlapping therewith. As a connection line CL on a touch electrode row disposed more distant from the pad part PD, the areas of portions of connection lines CL facing each other on the corresponding touch electrode row and a touch electrode row adjacent thereto may be increased. Thus, a voltage drop, fluctuation, etc. of a signal transferred through the connection line CL can be minimized. In addition, the area of each of first touch electrodes TE1 disposed at an outermost portion of the sensing area SA is increased, and thus the touch sensitivity of an edge portion of the sensing area SA can be improved.

In an exemplary embodiment, a width of the connection electrode CE overlapping with the connection line CL in the first direction DR1 may be wider than that of the connection line CL in the first direction DR1. Thus, occurrence of a defect in the connection line CL can be prevented or reduced.

FIG. 7 is an enlarged plan view illustrating another example of the portion AA shown in FIG. 1.

In FIG. 7, components identical to those described with reference to FIG. 6A are designated by like reference numerals, and their overlapping descriptions will be omitted.

In addition, a touch electrode shown in FIG. 7 may have a configuration substantially similar or identical to that of the touch electrode shown in FIG. 6A, except the shapes of portions of a connection line and a connection electrodes.

Referring to FIG. 7, a portion of a first touch electrode TE1, which protrudes to the non-sensing area NSA shown in FIG. 6, may be defined as a connection electrode CE. Also, the connection electrode CE may extend in the second direction DR2 from the protruding portion. At least a portion of the connection electrode CE may overlap with a connection line CL.

The connection electrode may extend longer in the first direction DR1 from the first touch electrode TE1 as it becomes more distant from the pad part PD. In addition, a plurality of connection electrodes CE extending in the second direction DR2 may have a substantially equal width.

The connection line CL may be formed to correspond to the planar shape of the connection electrode CE. At least portions of the connection line CL and the connection electrode CE may overlap with each other along the second direction DR2. Accordingly, as shown in FIG. 7, first and eleventh contact holes CH1 and CH11 are not located on the same line with respect to the second direction DR2. For example, the distance between the first touch electrode TE1 and a contact hole through which the connection electrode CE and the connection line CL are connected to each other corresponding to a touch electrode row in the first direction DR1 may become longer as they become more distant from the pad part PD.

As shown in FIG. 7, by the structure of the connection electrode CE and the connection line CL, interference between adjacent conductive patterns can be decreased, and manufacturing cost can be reduced.

In an exemplary embodiment, a width of the connection electrode CE overlapping with the connection line CL in the first direction DR1 may be wider than that of the connection line CL in the first direction DR1. For example, the connection electrode CE may cover (or overlap with) the entire connection line CL. Thus, occurrence of a defect in the connection line CL can be prevented or reduced.

Figure 8A:
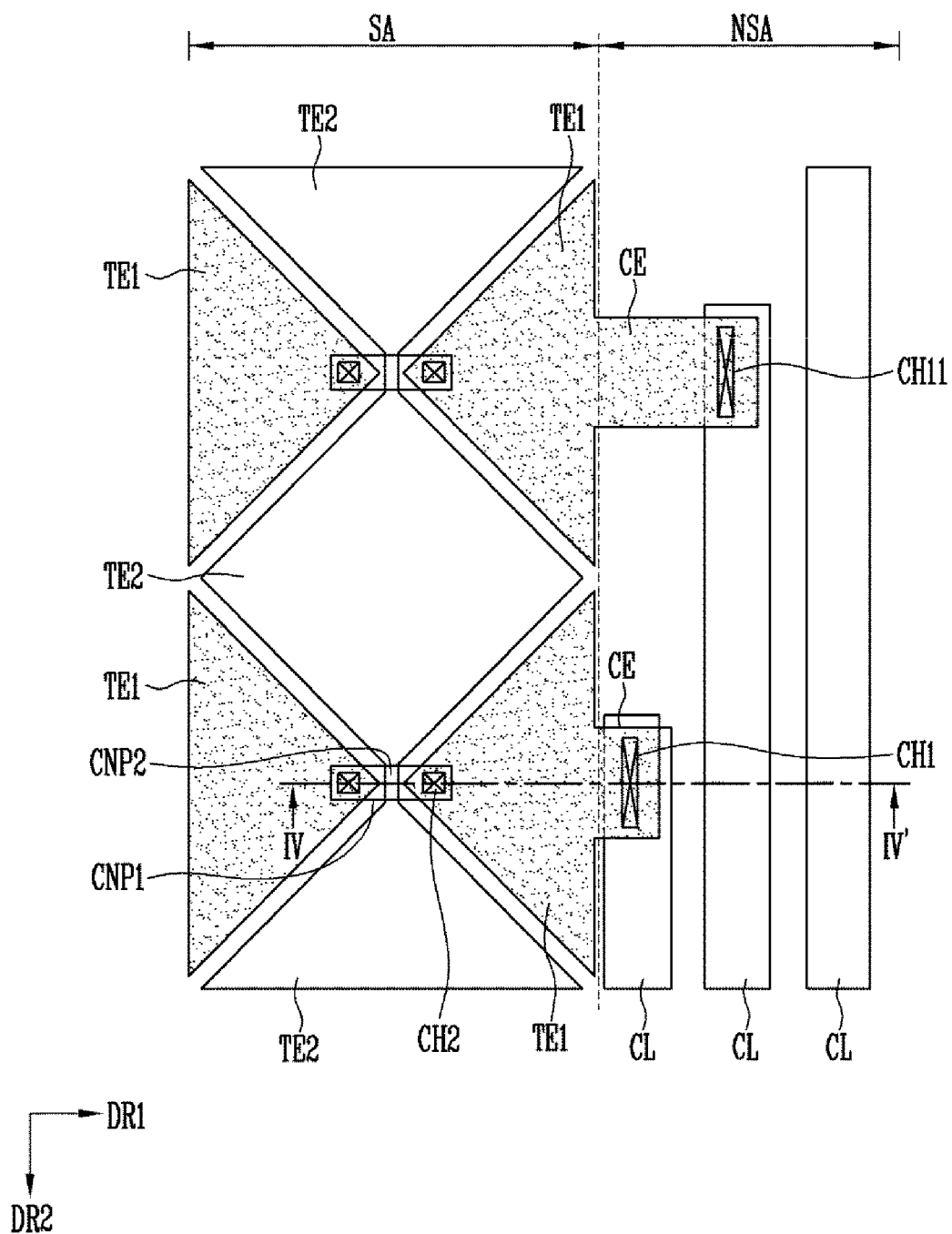
FIG. 8A is an enlarged plan view illustrating still another example of the portion AA shown in FIG. 1.
Figure 8B:
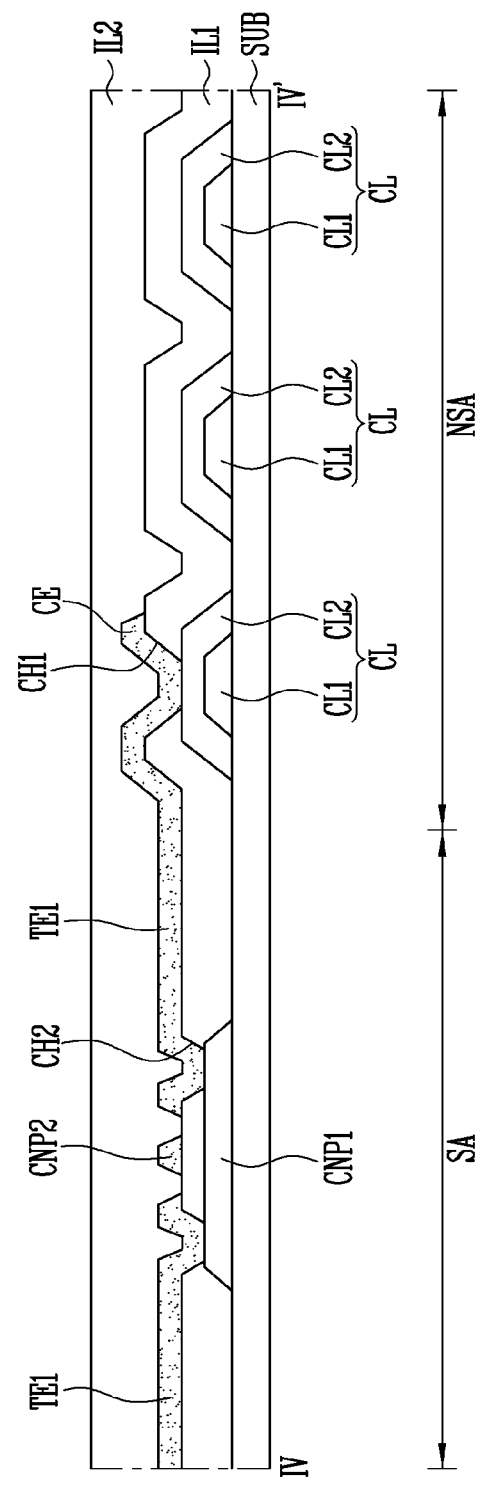
FIG. 8B is a sectional view taken along the line IV-IV' shown in FIG. 8A.

FIG. 8A is an enlarged plan view illustrating still another example of the portion AA shown in FIG. 1. FIG. 8B is a sectional view taken along the line IV-IV' shown in FIG. 8A.

In FIGS. 8A and 8B, components identical to those described with reference to FIGS. 6A to 7 are designated by like reference numerals, and their overlapping descriptions will be omitted. In addition, a touch electrode shown in FIGS. 8A and 8B may have a configuration substantially similar or identical to that of the touch electrode shown in FIG. 6A, except the shape of a portion of a connection electrode.

Referring to FIGS. 8A and 8B, a portion of a first touch electrode TE1, which protrudes to the non-sensing area NSA shown in FIG. 6, may be defined as a connection electrode CE.

The connection electrode CE may electrically connect the first touch electrode TE1 and a connection line CL. In an exemplary embodiment, the connection electrode CE does not overlap with the connection line in an area except a first contact hole CH1 (and an eleventh contact hole CH11). That is, the connection electrode CE does not extend in the second direction DR2.

At least one of a first connection line CL1 and a second connection line CL2 of the connection line CL may include the same material provided on the same layer as at least one of the first and second touch electrodes TE1 and TE2 and the first and second connection patterns CNP1 and CNP2 of the sensing area SA.

As described above, the connection electrode CE does not extend in the second direction DR2, so that manufacturing cost can be reduced.

Figure 9:
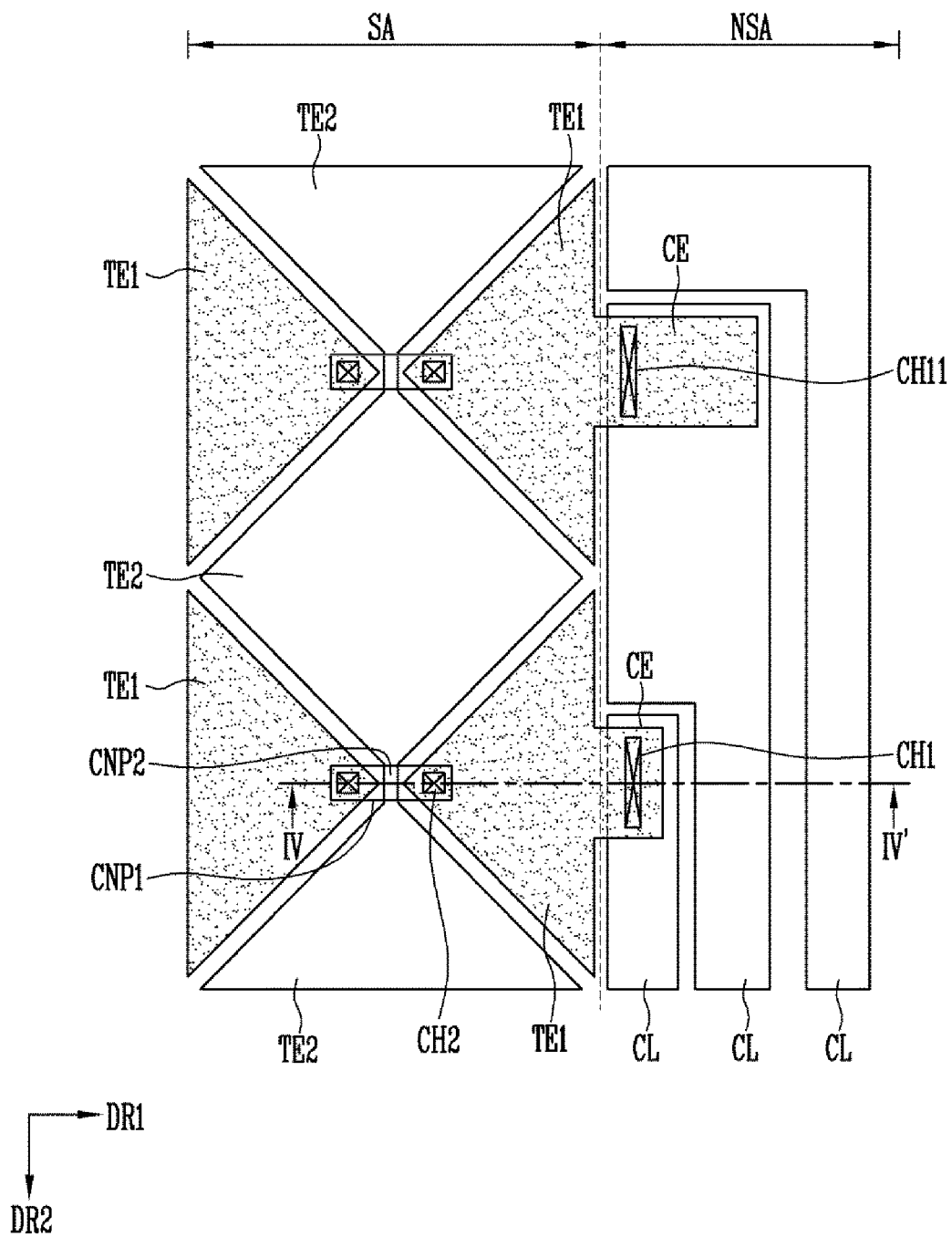
FIG. 9 is an enlarged plan view illustrating still another example of the portion AA shown in FIG. 1.

FIG. 9 is an enlarged plan view illustrating still another example of the portion AA shown in FIG. 1.

In FIG. 9, components identical to those described with reference to FIGS. 6A, 6B, and 8A are designated by like reference numerals, and their overlapping descriptions will be omitted.

Referring to FIG. 9, a portion of a first touch electrode TE1, which protrudes to the non-sensing area NSA shown in FIG. 6, may be defined as a connection electrode CE.

A connection line CL may be formed and disposed to having a shape substantially identical or similar to that of the connection line CL described with reference to FIG. 8A. In addition, contact holes CH1 and CH11 respectively connected to the connection line CL and the connection electrode CE may be substantially located on the same line in the second direction DR2.

The connection electrode CE may electrically connect the first touch electrode TE1 and the connection line CL. The connection electrode CE does not overlap with the connection line CL in an area except a first contact hole CH1 (and an eleventh contact hole CH11). That is, the connection electrode CE does not extend in the second direction DR2. The other configuration except the configuration of the connection electrode CE has been described with reference to FIGS. 6A and 6B, and therefore, overlapping descriptions will be omitted.

Figure 10A:
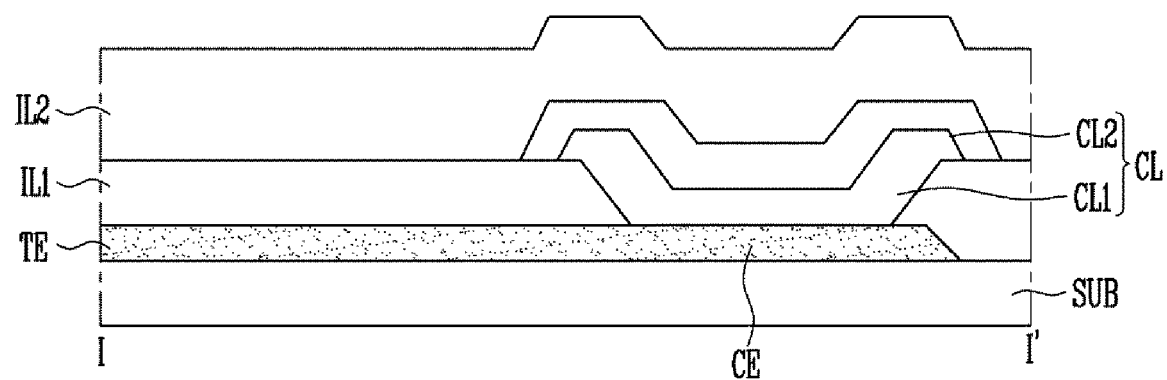
FIG. 10A is a sectional view taken along the line I-I' shown in FIG. 1 in accordance with another exemplary embodiment.
Figure 10B:
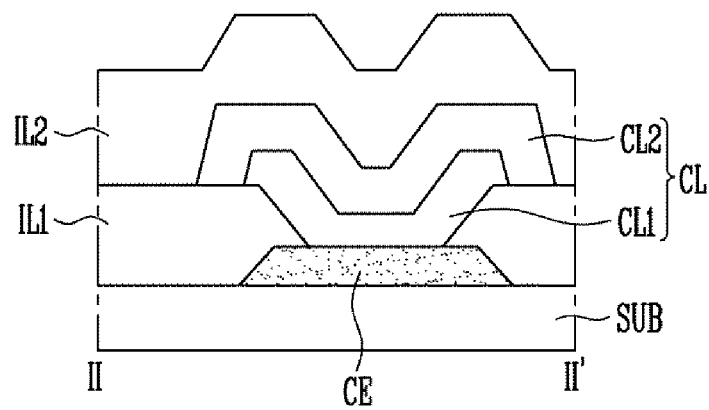
FIG. 10B is a sectional view taken along the line II-II' shown in FIG. 1 in accordance with another exemplary embodiment.
Figure 11A:
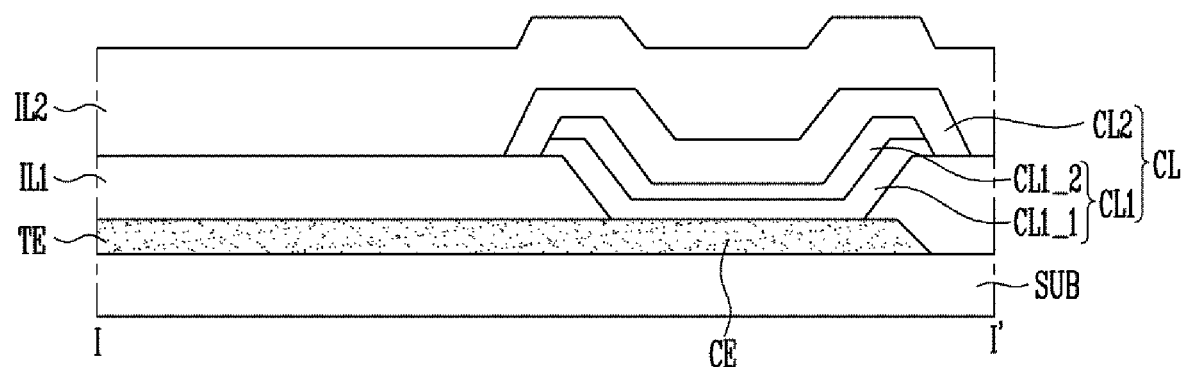
FIGS. 11A and 11B are sectional views taken along the line II-II' shown in FIG. 1 in accordance with other exemplary embodiments.
Figure 11B:
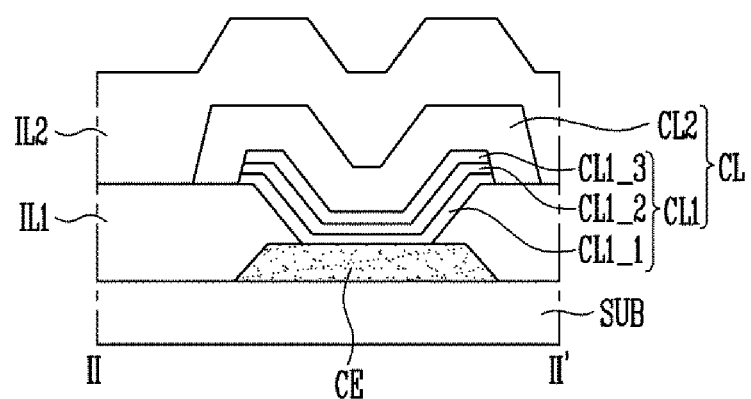

FIG. 10A is a sectional view taken along the line I-I' shown in FIG. 1 in accordance with another exemplary embodiment. FIG. 10B is a sectional view taken along the line II-II' shown in FIG. 1 in accordance with another exemplary embodiment. FIGS. 11A and 11B are sectional views taken along the line II-II' shown in FIG. 1 in accordance with other exemplary embodiments of the inventive concepts.

As shown in FIG. 10A, the connection line CL in accordance with the another exemplary embodiment may extend from the touch electrode TE such that the connection electrode CE connected to the connection line CL is disposed between the connection line CL and the base substrate SUB. As shown in FIG. 10B, the connection electrode CE may extend long along the length direction of the connection line CL such that the connection electrode CE and the connection line CL may be electrically connected through a contact having a line shape.

That is, the connection line CL in accordance with the another exemplary embodiment may include a first connection line CL1 having a single- or multi-layered structure and a second connection line CL2 surrounding upper and side surfaces of the first connection line CL1, and the touch electrode TE may extend to the non-sensing area NSA along the connection line CL such that the connection electrode CE protruding from an end of the touch electrode TE is connected to the first connection line CL1.

The first connection line CL1 may be provided in a single- or multi-layered structure formed of an opaque conductive material such as molybdenum (Mo), silver (Ag), titanium (Ti), copper (Cu) or aluminum (Al). The first connection line CL1 may include aluminum (Al) having low resistance so as to achieve low resistance of the first connection line CL1.

In addition, the second connection line CL2 may be disposed on the first connection line CL1. The second connection line CL2 may have a structure surrounding the upper and side surfaces of the first connection line CL1. The second connection line CL2 is a layer capping the first connection line CL1, and can prevent or reduce generation of a hillock of aluminum (Al). The second connection line CL2 may be selected from an opaque conductive material such as molybdenum (Mo), silver (Ag), titanium (Ti) or copper (Cu), and a transparent conductive material such as Indium Tin Oxide (ITO) or Indium Zinc Oxide (IZO).

As shown in FIG. 11A, the first connection line CL1 of the connection line CL may have a structure in which a first sub-line CL1_1 and a second sub-line CL1_2 are stacked. Alternatively, as shown in FIG. 11B, the first connection line CL1 of the connection line CL may have a structure in which a first sub-line CL1_1, a second sub-line CL1_2, and a third sub-line CL1_3 are stacked. For example, the first connection line CL1 in which the first sub-line CL1_1, the second sub-line CL1_2, and the third sub-line CL1_3 are sequentially stacked may have a structure of molybdenum (Mo)/aluminum (Al)/molybdenum (Mo). The thicknesses of molybdenum (Mo)/aluminum (Al)/molybdenum (Mo) may be 200 Å/3000 Å/500 Å, respectively. In addition, when the second connection line CL2 is provided in a single layer including molybdenum (Mo), the thickness of the second connection line CL2 may be 2600 Å. For example, when the second connection line CL2 includes Indium Tin Oxide (ITO), the thickness of the second connection line CL2 may be 1350 Å.

As described above, the first connection line CL1 of the connection line CL is to include at least one layer made of aluminum so as to achieve low resistance of the connection line CL. For example, when the first connection line CL1 has a single-layered structure as shown in FIG. 10A, the first connection line CL1 may be provided in a single layer including only aluminum or a single layer including aluminum and another metal. Also, when the first connection line CL has a multi-layered structure as shown in FIGS. 11A and 11B, the first connection line CL1 is to include at least one layer including only aluminum or including aluminum and another metal.

Hereinafter, a structure between the sensing area SA and the non-sensing area NSA of the touch sensor in which the connection line and the touch electrode TE are connected to each other in accordance with another exemplary embodiment will be described in detail as follows with reference to the accompanying drawings.

Figure 12A:
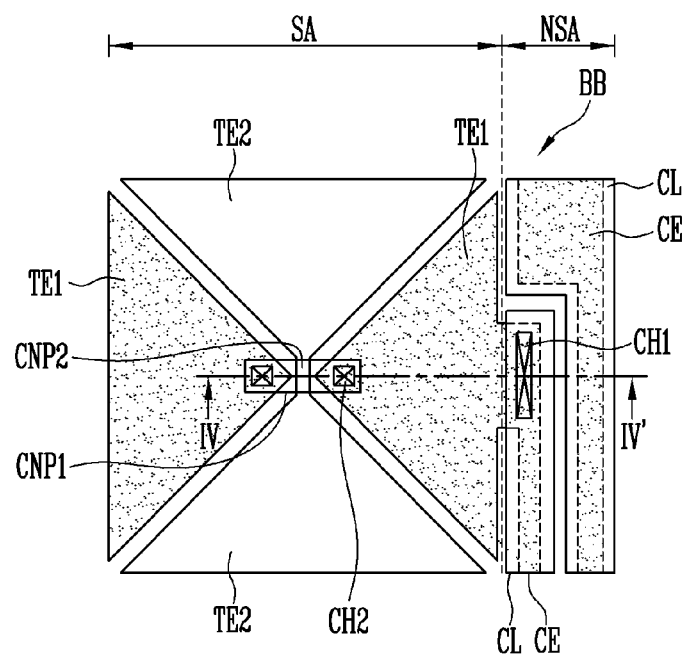
FIG. 12A is an enlarged plan view illustrating still another example of the portion AA shown in FIG. 1.
Figure 12B:
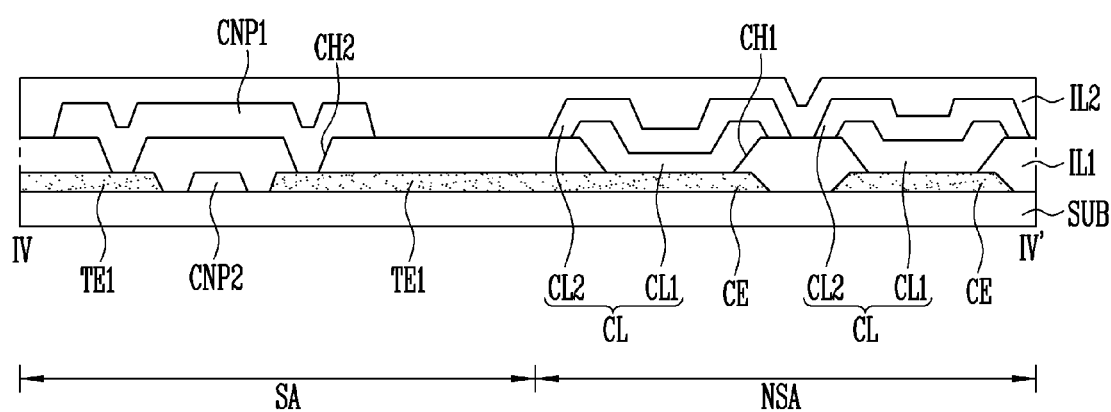
FIG. 12B is a sectional view taken along the line IV-IV' shown in FIG. 12A.

FIG. 12A is an enlarged plan view illustrating still another example of the portion AA shown in FIG. 1. FIG. 12B is a sectional view taken along the line IV-IV' shown in FIG. 12A.

As shown in FIGS. 12A and 12B, the touch electrode TE protrudes to the non-sensing area NSA, to be electrically connected to the connection line CL. At least one of the first connection line CL1 and the second connection line CL2 may be formed of the same material in the same layer as at least one of the first and second touch electrodes TE1 and TE2 and the first and second connection patterns CNP1 and CNP2 of the sensing area SA. A case where the first connection line CL1 is formed of the same material in the same layer as the first connection pattern CNP1 of the sensing area SA is illustrated in the drawings. However, the inventive concepts are not limited thereto, and the first connection pattern CNP1 may be formed of the same material in the same layer as at least a portion of the first connection line CL1 and the second connection line CL2.

Specifically, the connection electrode CE, the first and second touch electrodes TE1 and TE2, and the second connection pattern CNP2 may be first disposed on the base substrate SUB. The connection electrode CE, the first and second touch electrodes TE1 and TE2, and the second connection pattern CNP2 may be formed of a transparent conductive material such as Indium Tin Oxide (ITO) or Indium Zinc Oxide (IZO). The connection electrode CE has a shape extending from the first touch electrode TE1, and the connection electrode CE and the first touch electrode TE1 may have an integral structure.

The first and second contact holes CH1 and CH2 respectively exposing the connection electrode CE and the first touch electrode TE1 may be formed by disposing the first insulating layer IL1 on the base substrate SUB to cover the connection electrode CE, the first and second touch electrodes TE1 and TE2, and the second connection pattern CNP2 and selectively removing the first insulating layer IL1. In addition, the first connection line CL1 connected to the connection electrode CE through the first contact hole CH1 may be disposed on the first insulating layer IL1.

The second connection line CL2 is disposed on the first connection line CL1 to surround the upper and side surfaces of the first connection line CL1, and the first connection pattern CNP1 is formed to corresponding to the same material and the same layer as the second connection line CL2, so that adjacent first touch electrodes TE1 can be connected to each other through the first connection pattern CNP1.

That is, an arrangement order of the first and second touch electrodes, the first connection pattern, and the second connection pattern in accordance with the exemplary embodiment, which are shown in FIG. 6B, and an arrangement order of the first and second touch electrodes, the first connection pattern, and the second connection pattern in accordance with the another exemplary embodiment, which are shown in FIG. 11B, may be opposite to each other with respect to the first insulating layer IL1. As described above, the arrangement order of the first and second touch electrodes, the first connection pattern, and the second connection pattern may be easily modified, and is not limited to the drawings.

FIG. 13 is a graph comparing resistances of connection lines in accordance with a conventional art and an exemplary embodiment.

As shown in FIG. 13, the resistance of the connection line provided in a single layer made of molybdenum, which has a thickness of 2500 Å in accordance with the conventional art, is about 0.52Ω. However, when the connection line in accordance with the exemplary embodiment includes a first connection line having a structure of molybdenum (Mo)/aluminum (Al)/molybdenum (Mo) that respectively have thicknesses of 200 Å/3000 Å/500 Å and a second connection line provided in a single layer made of molybdenum (Mo), which has a thickness of 2600 Å, the resistance of the connection line is considerably decreased as about 0.11Ω.

That is, the touch sensor in accordance with the exemplary embodiment, which includes the first connection line including aluminum having low resistance and the second connection line surrounding upper and side surfaces of the first connection line, implements low resistance of the connection line CL. Thus, the touch sensor can be applied to a large-area display device.

In particular, although disconnection of the first connection line CL1 occurs, the second connection line CL2 minimizes the disconnection, and prevents or reduces generation of a hillock of aluminum (Al) included in the first connection line CL1, so that characteristics of the connection line CL can be improved.

Meanwhile, the above-described touch sensor may be separately manufactured to be attached onto a display panel such as a liquid crystal display panel or an organic light emitting display panel. However, an encapsulation substrate of the display panel may be the base substrate of the touch sensor. For example, the touch electrode, the pad part, the connection line, and the like, which are described above, may be formed on the top of the encapsulation substrate of the display panel. Thus, a process of attaching the separately manufactured touch sensor to the display panel is omitted. Accordingly, processes can be simplified, manufacturing cost can be reduced, and the display device can be slimmed.

In accordance with the inventive concepts, resistance of the touch sensor can be decreased by decreasing resistance of the connection line for connecting the touch electrode and the pad part.

Thus, some of the advantages that may be achieved by exemplary embodiments of the invention include a low-resistance touch sensor that is suitable for a large-area display device by decreasing resistance of a connection line for electrically connecting a pad part and a touch electrode of the touch sensor.

Although certain exemplary embodiments have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A touch sensor comprising:
a substrate including a sensing area and a non-sensing area;
a first touch electrode disposed on the sensing area of the substrate;
a pad part disposed on the non-sensing area of the substrate;
a connection line disposed entirely in the non-sensing area and electrically connecting the first touch electrode and the pad part, the connection line including a first connection line and a second connection line surrounding upper and side surfaces of the first connection line;
a first insulating layer disposed on the connection line in the non-sensing area, the first insulating layer including a first contact hole disposed in the non-sensing area and exposing a portion of the second connection line;
a connection electrode formed on the first insulating layer and comprising a first portion extending to the non-sensing area in a first direction from one end of the first touch electrode, a second portion extending from the first portion of the connection electrode in a second direction intersecting the first direction, and a third portion extending from the second portion of the connection electrode in the second direction, wherein the second portion has a first width in the first direction, the third portion has a second width in the first direction, the first width is greater than the second width, and the first portion of the connection electrode physically contacts the exposed portion of the second connection line through the first contact hole in the first insulating layer; and
a second touch electrode disposed on the sensing area of the substrate and spaced apart from the first touch electrode in the second direction,
wherein:
the second portion of the connection electrode faces one end of the first touch electrode in the first direction;
the connection electrode and the connection line overlap each other for an entire length of the connection line to extend to the pad part in the non-sensing area, the third portion of the connection electrode is spaced apart from the connection line with the first insulating layer interposed therebetween;
the connection electrode is disposed on the first insulating layer, which is in the non-sensing area, and extends to the pad part; and
the first connection line has a triple layer structure comprising stacked layers of molybdenum (Mo), aluminum (Al), and molybdenum (Mo) having thicknesses of 200 Å, 3000 Å, and 500 Å, respectively.

2. The touch sensor of claim 1, wherein the second connection line includes an opaque conductive material or a transparent conductive material.

3. The touch sensor of claim 1, wherein the connection electrode includes a transparent conductive material.

4. The touch sensor of claim 1, wherein the touch sensor includes:
a touch electrode row having a plurality of first touch electrodes arranged along the first direction;
a touch electrode column having a plurality of second touch electrodes arranged along the second direction;
a first connection pattern electrically connecting two first touch electrodes adjacent to each other; and
a second connection pattern electrically connecting two second touch electrodes adjacent to each other,
wherein the plurality of first touch electrodes includes the first touch electrode and the plurality of second touch electrodes includes the second touch electrode.

5. The touch sensor of claim 1, wherein the second connection line is a single layer made of molybdenum (Mo) and having a thickness of 2600 Å.

6. A touch sensor comprising:
a substrate including a sensing area and a non-sensing area;
a touch electrode disposed on the sensing area of the substrate;
a pad part disposed on the non-sensing area of the substrate;
a connection electrode extending to the non-sensing area from one end of the touch electrode;
a first insulating layer disposed on the connection electrode in the sensing area and the non-sensing area, the first insulating layer including a first contact hole exposing at least a portion of the connection electrode; and
a connection line disposed entirely in the non-sensing area and disposed on the first insulating layer, the connection line electrically connecting the touch electrode and the pad part by being physically connected to the exposed portion of the connection electrode through the first contact hole in the first insulating layer, the connection line including a first connection line and a second connection line surrounding upper and side surfaces of the first connection line,
wherein the first connection line has a triple layer structure comprising stacked layers of molybdenum (Mo), aluminum (Al), and molybdenum (Mo) having thicknesses of 200 Å, 3000 Å, and 500 Å, respectively, and the second connection line is a single layer made of molybdenum (Mo) and having a thickness of 2600 Å.

7. The touch sensor of claim 6, wherein the connection electrode extends along a direction in which the connection line extends toward the pad part, and overlaps with at least a portion of the connection line.

8. The touch sensor of claim 6, wherein the connection electrode includes a transparent conductive material.

9. The touch sensor of claim 6, wherein the touch sensor includes:
- a touch electrode row having a plurality of first touch electrodes arranged along a first direction;
- a touch electrode column having a plurality of second touch electrodes arranged along a second direction intersecting the first direction;
- a first connection pattern electrically connecting a first touch electrode to an adjacent first touch electrode; and
- a second connection pattern electrically connecting a second touch electrode to an adjacent second touch electrode, wherein the touch electrode is a terminal one of the first and/or second touch electrodes adjacent the non-sensing area.

\* \* \* \* \*